June 17, 1930.             C. C. WHITTAKER              1,764,376
                        COMMUTATOR ROCKING DEVICE
                          Filed June 29, 1928              2 Sheets-Sheet 2
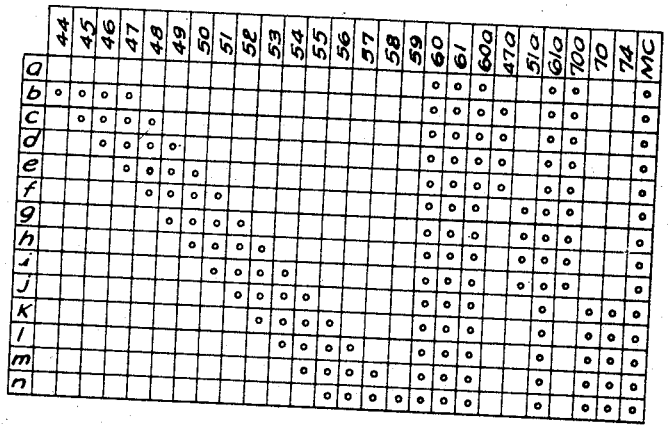
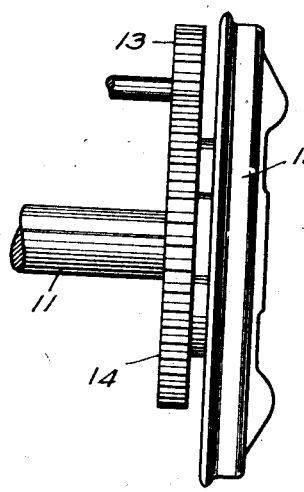
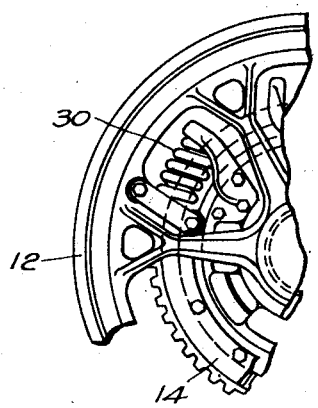
INVENTOR
Charles C. Whittaker.
BY
Wesley G. Carr
ATTORNEY Patented June 17, 1930

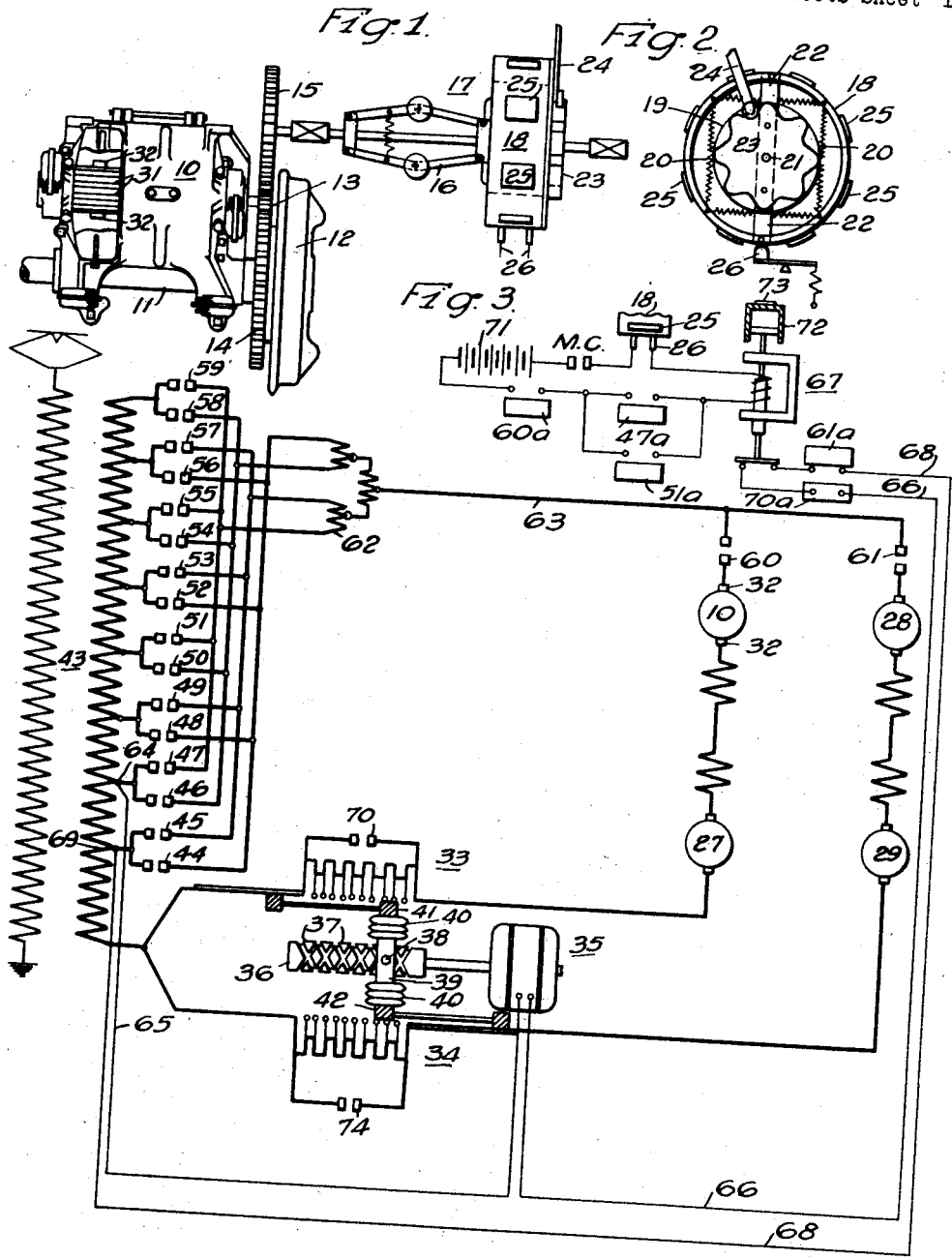

1,764,376

UNITED STATES PATENT OFFICE

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA

COMMUTATOR-ROCKING DEVICE

Application filed June 29, 1928. Serial No. 289,317.

My invention relates generally to control systems and particularly to the control of the driving motors of electric locomotives.

In the operation of heavy trains on electrified railways, it is common practice to employ one locomotive at the head of the train and another "pusher" locomotive at the rear of the train. It often happens that power is applied to the motors of one locomotive before it is applied to the motors of the other locomotive and, since a single locomotive is incapable of moving the train, the motors to which power is applied cannot rotate and the current supplied through the brushes flows continuously through the same commutator bars. When the entire motor current continuously flows through a single commutator bar for a period of time, excessive heating occurs and, as a result, the commutator bar may warp.

The object of my invention, generally stated, is to prevent heating the commutator bars or motors during the starting period, if the load cannot be immediately set in motion.

A more specific object of my invention is to provide for rocking the commutator cylinders of traction motors after power is applied and before the train is moved.

A further object of my invention is to provide for varying the torque exerted by the individual motors of a group without varying the total torque of the group of motors.

Another object of my invention is to provide for increasing the voltage across one motor as the voltage in another motor decreases a corresponding amount.

It is also an object of my invention to provide a motor-operated variable resistor for controlling the voltage applied to a driving motor which shall be rendered inactive upon movement of the driven load.

Other objects of my invention will become apparent to those skilled in the art when the following description is considered in conjunction with the accompanying drawing, in which:

Figure 1 is a view, in side elevation, of a traction motor geared to a driving wheel and an auxiliary contact device;

Fig. 2 is an end view of the auxiliary contact device shown in Fig. 1;

Fig. 3 is a diagrammatic view of a control system, for controlling a group of traction motors, connected in accordance with my invention;

Fig. 4 is a sequence chart showing the sequence of closure of the switches embodied in the system shown in Fig. 3;

Fig. 5 is a view, in side elevation, of the driving gear for a locomotive; and

Fig. 6 is a view, in end elevation, of a portion of a locomotive driving wheel showing the driving gear connected to the driving wheel through a series of springs.

Referring now to the drawings, a traction motor 10 is mounted upon an axle 11 of a locomotive driving wheel 12. The motor 10 is connected to drive the locomotive driving wheel 12 through a pinion 13 and a gear 14 resiliently connected to the locomotive driving wheel 12 in any suitable manner well known in the art, such as that shown in Figure 5.

The traction motor 10 is connected, through a gear 15 and a centrifugally-operated clutch member 16, to an auxiliary contact device 17. The contact device 17 is provided with an outer drum 18 and an inner drum 19, shown clearly in Fig. 2.

The centrifugally-operated clutch mechanism 16 transmits motion to the inner drum 19 which is connected, through a series of springs 20, to the outer drum 18. The outer drum 18 and the inner drum 19 of the auxiliary contact device are mounted concentrically upon a shaft 21, and a brace member 22 is rigidly connected to the outer drum 18 and is free to move on the shaft 21.

A "star-wheel" 23 is rigidly attached to the brace member 22 and coacts with a pawl 24 to restrict the motion of the outer contact drum 18 and stop it at a desired point.

When an oscillating motion occurs in the motor 10, it is transmitted, through the gear 15 and the clutch 16, to the inner drum 19 of the auxiliary contact device 17 which may be moved relative to the outer drum 18 because of the flexibility of the springs 20 which connect the two drums together. In this way, the outer drum 18 is prevented from moving during such oscillation unless the amplitude of the oscillation is sufficient to cause the tension in the springs 20 to overcome the force of the pawl 24 upon the star wheel 23 and cause the outer drum 18 to advance a notch.

It will be apparent that, when the motor 10 begins its unidirectional operation, sufficient tension will be exerted continuously upon the springs 20 to cause the outer drum 18 to move with the inner drum 19. This condition, however, will exist only until the centrifugally-operated clutch member 16 becomes disconnected from the inner drum 19 when the motor 10 reaches a predetermined speed.

The outer drum 18 of the auxiliary contact device 17 is provided with a plurality of contact plates 25 mounted on its outer surface and insulated therefrom. A pair of contact fingers 26 are disposed to engage the contact plates 25 when the outer drum 18 is moved to a predetermined position. The star-wheel 23 and the pawl 24 coact to stop the outer drum 18 in position where the contact fingers 26 will stand between two of the contact plates 25. Since the contact fingers 26 engage the contact plates 25 only when the outer drum 18 is being advanced and the pawl passes over a tooth of the star wheel, and such engagement exists for a relatively short period of time because of the action of the springs 20 between the outer drum 18 and the inner drum 19.

The traction motor 10 represents one of a group of traction motors 10, 27, 28 and 29, shown connected in the circuits of Fig. 3 and disposed to be operated together, as will be described hereinafter.

When the traction motor 10 is operated, power is transmitted, through the pinion 13, the driving gear wheel 14 and the spring 30, to the driving wheel 12. This method of connection provides a resilient drive and enables the motor to have a slight movement to compress the spring 30 before the driving wheel 12 is set into motion. The relative movement between the driving gear wheel 14 and the driving wheel 12, which is permitted through the flexibility of the spring 30, is sufficient to enable the motor 10 to advance through an angle equivalent to four or five of the commutator bars 31.

The commutator bars 31 are engaged by a pair of brushes 32 through which current is supplied to the armature of the motor 10. When power is initially applied to the brushes 32 of the traction motor 10, the rotor rotates and advances the driving gear wheel 14 to compress the spring 30 and, if the train behind the locomotive is so heavy that the driving wheel 12 will not rotate, the motor 10 comes to a standstill, with power still being applied through its brushes 32, so that current flows continuously through the same commutator bars as long as the motor stands in this position.

My invention provides a method of varying the power applied to the motor 10 during a starting period when the torque exerted by the group of motors 10, 27, 28 and 29 is insufficient to set their corresponding driving wheels 12 in motion. The variation in power occurs in all of the motors 10, 27, 28 and 29, but, for simplicity, will be described only in connection with the motor 10.

Upon the initial application of voltage to the motor 10, the driving gear wheel 14 is advanced to compress the spring 30 and establish a state of equilibrium between the torque exerted by the motor 10 and the spring 30. If now, the voltage applied to the motor 10 be increased or decreased, the spring 30 will be respectively compressed or released to an amount corresponding to the variation in the torque exerted by the motor, consequent to changes of voltage. In this way, the commutator cylinder may be rocked when a variation in the voltage across the brushes 32 occurs and causes an increase or decrease in the torque exerted by the motor 10.

A pair of variable resistors 33 and 34 are connected in series-circuit relation with the pairs of motors 10, 27 and 28, 29, respectively, to vary the voltage applied. The variable resistors 33 and 34 are operated by a motor 35 in such manner that, as the resistance in one motor circuit is increased, the resistance in the other is decreased a corresponding amount. In this way, the voltage across the motors 10 and 27 may be increased when the voltage across the motors 28 and 29 is decreased.

Furthermore, the sum of the voltage across the motors 10 and 27 and the voltage across the motors 28 and 29 will be maintained at a constant value and, in this way, the total torque exerted by the group of motors will remain at a fixed value during the period in which the voltage applied to the respective motor armatures is being varied to produce a rocking of their respective commutator cylinders.

The motor 35 drives a member 36 having right-hand and left-hand helical grooves 37 which are co-extensive. A follower 38, of a type well-known in the art for following continuous right-hand and left-hand grooves, carries a cross arm 39 to follow the grooves 37, as the screw member 36 rotates continuously in the same direction, and thereby moves it alternately right and left, as viewed in the drawing.

The cross arm 39 is provided with insulators 40 on which are mounted contact members 41 and 42 to engage the resistors 33 and 34, respectively. As the cross arm 39 is moved from right to left, the amount of the resistor 33 which is connected in circuit is increased while the amount of the resistor 34, which is connected in circuit, is decreased a corresponding amount, while the opposite variation occurs when the cross arm 39 is moved from left to right.

The supply circuit for the motors 10, 27, 28, 29, and 35 is shown in Fig. 3 and, inasmuch as the particular auxiliary control system which may be utilized to effect the desired main circuit connections is not a part of my present invention and may be readily supplied by those skilled in the art, I do not deem it necessary to illustrate or describe the same. The following description of the circuit connections, when taken in conjunction with the sequence chart shown in Figure 4, will give a clear explanation of the circuits established during the functioning of the invention.

The primary winding of the transformer 43 is connected between the "trolley" and "ground" conductors from which it receives its supply of power. The secondary winding of the transformer 43 is provided with a plurality of taps from which a variable voltage may be obtained by closure of any of the desired switches 44 to 59. The switches 44 to 59 may be closed, in accordance with the sequence chart, to apply an increasing voltage to the traction motors 10, 27, 28 and 29 during the starting period.

The operation of the transformer switches 44 to 59 is accomplished through the operation of a master controller or sequence switch, in a manner well-known in the art, to control the operation of the traction motors 10, 27, 28 and 29.

Upon the actuation of a master controller to its first position, the switches indicated in step $a$ of the sequence chart are actuated, that is, the auxiliary switch "MC", the motor switches 60 and 61 and the interlocking contact members 60a and 61a are closed. When the master controller is advanced to its second position, the switches noted in step $b$, in the sequence chart, are operated to close the transformer switches 44, 45, 46 and 47 and interlock contact member 47a, and a starting voltage of low value is supplied to the traction motors 10, 27, 28 and 29, through the preventive coils 62 and conductor 63 to impart an impulse to the armatures of the traction motors.

Upon the closure of the interlocking contact member 61a, a circuit is completed which may be traced from the tap 64 of the transformer 43, through conductor 65, motor 35, conductor 66, interlocking contact member 70a, the contact member of the time element relay 67, interlocking contact member 61a and by conductor 68, to the tap 69 of the transformer 43, thereby supplying power to the auxiliary motor 35 and operating the variable resistors 33 and 34 to vary the voltage applied to produce an oscillation of the commutators of the traction motors 10, 27, 28 and 29, in case the power supplied is insufficient to set the driving wheels 12 into motion, as described above.

When the driving wheels 12 are finally set into motion, the contact device 17 is rotated until the centrifugal clutch 16 is disengaged. The centrifugal clutch 16 may be adjusted to become disengaged at any predetermined speed of the traction motor 10. In this particular embodiment, the clutch 16 will be considered as disengaging the inner drum 19 at a speed which cannot be attained until the switch 55 is closed, or that is at the control position "$j$" of the sequence chart if the motors are operating at their full speed corresponding to this voltage. When the outer drum 18 of the contact device 17 advances, the contact fingers 26 are momentarily bridged by the contact plate 25, and a circuit is established which may be traced from the battery 71, through the switch "MC", the contact fingers 26, bridged by the conductor plate 25, the operating coil of the time-element relay 67, interlocking contact 47a and interlocking contact 60a, returning to the opposite terminal of the battery 71. This circuit exists for only the period of time which is required for the outer drum 18 of the contact device 17 to advance across the contact plate 25 but is sufficient to energize the operating coil of the time-element relay 67 and actuate its contact members into their circuit-interrupting position, thereby interrupting the supply of energy to the motor 35.

The time-element relay 67 is provided with a dashpot 72 having a valve 73 which permits an unrestricted upward motion of the relay but retards its downward travel when the operating coil is deenergized.

When the motor 10 has started its load, the outer drum 18 of the contact device 17 will be advanced rapidly enough to complete the circuit for the energizing coil of the time-element relay so often that the frequency of the impulses, in conjunction with the action of the dash-pot 72, maintains the contact members in their open position.

Since the centrifugal clutch 16 is adjusted to be disengaged from the inner drum 19 of the contact device 17 at approximately the time that the switch 55 is closed, it will be observed from the sequence chart that the interlocking contact member 70a is actuated to its circuit-interrupting position at substantially the same time that the control position "$j$" is reached and the switches 70 and 74 are actuated to their closed positions to by-pass the variable resistors 33 and 34, respectively, during the same control position. In this way the operation of the motor 35 is interrupted, and the variable resistors 33 and 34 are by-passed from the main motor circuits, so that the traction motors 10, 27, 28 and 29 will receive no further variations in their voltage consequent to the operation of the variable resistors 33 and 34 so that the traction motors may be accelerated until full voltage is applied across their terminals, as shown in the control position "n" of the sequence chart.

The interlocking contact member 51a is operated simultaneously with the switch 51, as shown in the sequence chart, and is disposed, when in its closed position, to by-pass the interlocking contact member 47a. The interlocking contact member 51a is actuated to its open position simultaneously with the interlocking contact member 70a, as shown in position "j" of the sequence chart. In this way, the supply circuits for the relay 67 and the motor 35 are interrupted at approximately the same time as the clutch 16 is disengaged.

It will be readily understood that such device for varying the torque in a traction motor and thereby rocking its armature against the flexibility of a resilient drive may be applied to any number of motors and is not limited to the specific arrangement shown herein. Neither is the system limited in its application to motors driven from an alternating source of power, as shown in this embodiment, but may be readily applied to direct-current systems.

The embodiment may be further modified and applied to other types of drives than the one described hereinbefore, without departing from the spirit and scope of the invention, and it is desired that the foregoing description shall be construed as illustrative and not in a limiting sense.

I claim as my invention:

1. In a motor-control system, in combination, a plurality of driving motors provided with armatures and commutators, a source of power for the motors, means for connecting the motors to the source of power, means for varying the voltage applied to the motors and causing the voltage applied to one motor to increase as the voltage applied to another decreases to thereby vary the torque in the motors, and a resilient drive connecting the motors to the load, said resilient drive and variable torque coacting to oscillate the motor armature and commutator during the starting of the motor.

2. In a motor-control system, in combination, a plurality of driving motors provided with armatures and commutators, a source of power for the motors, a resilient drive for connecting the motors to the load, and means for continuously varying the voltage applied to the motors, cooperative with the resilient drive to give the motors an oscillatory motion.

3. In a motor-control system, in combination, a plurality of driving motors provided with armatures and commutators, a source of power for the motors, a resilient drive connecting the motors to the load, means for varying the torque exerted by the respective motors upon the resilient drive, whereby the armature and the commutators of the motors may be rocked against the resilient drive, said torque-varying means being disposed to maintain a constant total pull of the motors on the load during the period of rocking.

4. In a motor-control system, in combination, a plurality of driving motors provided with armatures and commutators, a source of power for the motors, a plurality of resilient drives connecting the motors to the load, means for varying the torque exerted by the respective motors upon the resilient drive, whereby the armatures and the commutators of the motors may be rocked against the flexibility of the resilient drives, said torque-varying means being disposed to maintain a constant total pull of the motors on the load during the period of rocking, and means for rendering said torque-varying means inoperative when the load is actuated.

5. In a motor-control system, in combination, a plurality of driving motors provided with armatures and commutators, a source of power for the motors, a variable resistor connected in circuit with each of said motors, means for operating said resistors to alternately increase and decrease the resistance of each and to correspondingly decrease one resistor as another is increased, thereby varying the torque in each motor without varying the total torque.

6. In a motor-control system, in combination, a plurality of driving motors provided with armatures and commutators, a source of power for the motors, a resilient drive connecting the motors to the load, a variable resistor connected in circuit with each of the motors, means for operating said resistors to alternately increase and decrease the resistance of each, and to correspondingly decrease one resistor as another is increased, thereby varying the torque exerted by each motor without varying the total torque, said resilient drive and variable torque coacting to continuously oscillate the motor armatures and commutators, during the starting of the motors.

7. In a motor-control system, in combination, a plurality of driving motors provided with armatures and commutators, a source of power for the motors, a resilient drive connecting the motors to the load, a variable resistor connected in circuit with each of the motors, means for operating said resistors to alternately increase and decrease the resistance in the motor circuits, and to correspondingly decrease the resistance in one motor circuit as the resistance in another is increased, thereby varying the torque exerted by the individual motors without varying the total torque, said resilient drive and variable torque coacting to oscillate the motor armatures and commutators during the starting period and means for rendering said torque-varying means inactive when the load is in motion.

8. In a motor-control system, in combination, a driving motor provided with a commutator cylinder and brushes disposed to engage the commutator cylinder, a resilient drive through which the motor exerts its driving action and means for varying the torque of the motor thereby to unbalance the driving forces delivered by the motor and the reactive forces of the resilient drive to effect an oscillatory movement of the commutator cylinder relative to the brushes to distribute the heating of the commutator.

9. In a motor-control system, in combination, a driving motor provided with a commutator cylinder and brushes disposed to ride on the commutator cylinder, a resilient drive through which the motor acts, and means for unbalancing the forces exerted by the motor and resilient drive to effect arc oscillation of the commutator cylinder relative to the brushes to distribute the heating of the commutator cylinder during the starting of the motor.

10. In a motor-control system, in combination, a propelling motor provided with a commutator cylinder and brushes disposed to engage the commutator cylinder, means for varying the torque delivered by the motor during starting and a drive for receiving the torque of the motor, said drive being adapted to deliver a varying reactive force to the motor when receiving a vary torque, whereby the commutator cylinder is oscillated relative to the brushes to distribute heating during the starting of the motor.

11. In a motor-control system, in combination, a plurality of driving motors, said motors being provided with commutator cylinders and brushes disposed to engage the commutator cylinders, a plurality of resilient drives for connecting the motors to a common load and means for unbalancing the forces exerted by the respective motors and resilient drives without varying the total effort exerted by the motors to move the load, whereby the commutator cylinders of the respective motors are oscillated relative to the brushes to distribute the heating of the commutators during the starting of the motors and before the load is moved.

12. In a motor-control system, in combination, a plurality of driving motors, said motors being provided with commutator cylinders and brushes disposed to engage the commutator cylinders, means for varying the torque delivered by the respective motors during starting without varying the total torque of the motors during starting, and a drive for connecting the respective motors to a common load, said drive being adapted to deliver a varying reactive torque, whereby a constant effort to move the load is maintained and the commutator cylinders are oscillated relative to the brushes to distribute heating during starting of the motors until the load has been accelerated to a predetermined speed.

13. In a motor-control system, in combination, a plurality of driving motors, said motors being provided with commutator cylinders and brushes disposed to engage the commutator cylinders, means for increasing the torque delivered by one motor while the torque delivered by another motor is being decreased a corresponding amount, and a drive for connecting the respective motors to a common load, said drive being adapted to deliver a varying reactive force when receiving a varying torque, whereby a constant effort to move the load is maintained and the commutator cylinders are oscillated relative to the brushes to distribute heating during starting of the motors until the load has been accelerated to a predetermined speed.

14. In a motor-control system, in combination, a driving motor provided with an armature, commutator cylinder, and commutator brushes, a source of power for the motor, means for applying a varying voltage to the motor to develop a varying torque, and means cooperative with the motor to effect an oscillatory movement of the armature to move the commutator cylinder relative to the commutator brushes.

15. In a motor-control system, in combination, a driving motor provided with an armature, commutator cylinder and commutator brushes, a source of power for supplying the motor, means for periodically varying, through a predetermined cycle, the voltage applied to the motor, and a resilient drive cooperative with the motor to effect an oscillatory movement of the armature to effect continuous movement of a commutator cylinder relative to the commutator brushes.

16. A motor-control system, in combination, a plurality of driving motors provided with armatures, commutator cylinders and commutator brushes, a source of power for supplying the motors, means for applying a continuously varying voltage to each of the motors to develop a varying torque, said voltage-carrying means being disposed to cause the application of a constant average voltage to the motors, and means cooperative with said motors to effect an oscilatory movement of the armatures in response to the application of the continuously varying voltage to effect an oscillatory movement of the commutator cylinder relative to the commutator brushes.

In testimony whereof, I have hereunto subscribed my name this 25th day of June, 1928.

CHARLES C. WHITTAKER.